United States Patent
Ruiz

(10) Patent No.: US 12,472,605 B2
(45) Date of Patent: Nov. 18, 2025

(54) PROCESS AND APPARATUS FOR INTEGRATED SUCKER ROD CONDITIONING AND SHOT PEENING

(71) Applicant: TRC Services, Inc., The Woodlands, TX (US)

(72) Inventor: Rodrigo Ariel Ruiz, The Woodlands, TX (US)

(73) Assignee: TRC SERVICES, INC., The Woodlands, TX (US)

(*) Notice: Subject to any disclaimer, the term of this patent is extended or adjusted under 35 U.S.C. 154(b) by 0 days.

(21) Appl. No.: 19/012,422

(22) Filed: Jan. 7, 2025

(65) Prior Publication Data

US 2025/0326088 A1    Oct. 23, 2025

Related U.S. Application Data

(60) Provisional application No. 63/636,974, filed on Apr. 22, 2024.

(51) Int. Cl.
*B24C 1/10* (2006.01)
*B24C 3/08* (2006.01)
(Continued)

(52) U.S. Cl.
CPC ............... *B24C 1/10* (2013.01); *B24C 3/083* (2013.01); *B24C 3/32* (2013.01); *B24C 9/003* (2013.01); *E21B 17/00* (2013.01)

(58) Field of Classification Search
CPC ........ Y10T 29/479; B21D 31/06; C21D 7/06; B24C 1/10; B24C 3/083; B24C 3/14; B24C 3/32; B24C 5/06; B24C 9/003
See application file for complete search history.

(56) References Cited

U.S. PATENT DOCUMENTS 2,239,044 A * 4/1941 Leighton .............. B21C 9/00
                                                        451/39
2,337,048 A * 12/1943 Huyett .................. B24C 3/083
                                                        451/89
(Continued)

FOREIGN PATENT DOCUMENTS

CN    1097838 A    1/1995
CN    1766335 A    5/2006
(Continued)

OTHER PUBLICATIONS

FR 3100336A1, Badreddine et al. Mar. 2021.*

(Continued)

*Primary Examiner* — Edward T Tolan
(74) *Attorney, Agent, or Firm* — Cabello Hall Zinda PLLC

(57) ABSTRACT

Systems and methods treat sucker rods in a machine through a multi-step process. Initially, sucker rods are cleaned before being conditioned. The conditioning process involves using a defined type and a defined size of media, applied at a first intensity to the rods using first media accelerators (first wheels with a specific diameter and rotational speed, and/or imparting a certain amount of media). The conditioned surfaces are then shot peened at a higher intensity using second media accelerators, which can have larger diameters, faster rotational speeds, and/or can impart a greater amount of media. Both the conditioning and shot peening processes involve reclaiming the media for reuse.

30 Claims, 8 Drawing Sheets

(51) Int. Cl.
*B24C 3/32* (2006.01)
*B24C 9/00* (2006.01)
*E21B 17/00* (2006.01)

(56) References Cited

U.S. PATENT DOCUMENTS

| | | | | |
|---|---|---|---|---|
| 3,073,022 | A | * | 1/1963 | Bush ................. C21D 7/06 29/90.01 |
| 3,489,620 | A | | 1/1970 | Current |
| 3,668,912 | A | | 6/1972 | Baughman et al. |
| 3,731,432 | A | * | 5/1973 | Carpenter, Jr. ......... B24C 1/086 451/87 |
| 3,958,049 | A | | 5/1976 | Payne |
| 4,045,591 | A | | 8/1977 | Payne |
| 4,100,782 | A | | 7/1978 | Clay |
| 4,604,881 | A | * | 8/1986 | Lienert ................ B24C 3/083 29/90.7 |
| 4,693,102 | A | * | 9/1987 | Amy .................. B24C 7/0092 72/53 |
| 5,113,680 | A | * | 5/1992 | Matsuura ............ G01N 29/046 73/861.73 |
| 5,515,707 | A | * | 5/1996 | Smith ................. B21C 37/30 72/53 |
| 6,612,909 | B2 | | 9/2003 | Wern |
| 7,703,312 | B2 | * | 4/2010 | David ................. F01D 5/3007 451/39 |
| 7,946,009 | B2 | * | 5/2011 | Dixon ................ F16F 1/024 29/90.7 |
| 7,985,938 | B2 | | 7/2011 | Johnson |
| 8,281,472 | B2 | | 10/2012 | Labonte et al. |
| 8,602,113 | B2 | | 12/2013 | Jin et al. |
| 8,839,499 | B2 | | 9/2014 | LaBonte et al. |
| 8,900,372 | B2 | | 12/2014 | White |
| 8,920,570 | B2 | | 12/2014 | White |
| 9,272,313 | B2 | | 3/2016 | White |
| 9,840,893 | B2 | | 12/2017 | Johnson |
| 10,195,699 | B2 | | 2/2019 | Johnson et al. |
| 2005/0160780 | A1 | * | 7/2005 | Kimura ................. B24C 9/006 72/53 |
| 2008/0066512 | A1 | | 3/2008 | Ushida et al. |
| 2008/0196235 | A1 | | 8/2008 | Gereluk |
| 2014/0053404 | A1 | | 2/2014 | Johnson et al. |
| 2015/0300148 | A1 | | 10/2015 | Johnson |
| 2016/0151819 | A1 | | 6/2016 | Johnson et al. |
| 2021/0123113 | A1 | | 4/2021 | Liao et al. |

FOREIGN PATENT DOCUMENTS

| | | |
|---|---|---|
| CN | 102699629 A | 10/2012 |
| CN | 206898700 U | 1/2018 |
| CN | 108188749 A | 6/2018 |
| CN | 108823366 A | 11/2018 |
| CN | 208977620 U | 6/2019 |
| CN | 110340808 A | 10/2019 |

OTHER PUBLICATIONS

DE 10244940A1, Jankow Apr. 2004.*
DE 102020108956A1, Olivier et al. Sep. 2021.*
Int'l Search Report and Written Opinion in PCT/US2025/010603, dated Mar. 3, 2025, 18-pgs.

* cited by examiner

| Sucker Rod Hardness Range in Rockwell C reference (HRC) According to ASTM E18 | | | | | | | | -22 | |
|---|---|---|---|---|---|---|---|---|---|
| Sucker Rod Grade 1 | | Sucker Rod Grade 2 | | Sucker Rod Grade 3 | | Sucker Rod Grade 4 | | | |
| 12 - 22 HRC | | 22 - 30 HRC | | 23 - 30 HRC | | 30 - 33 HRC | | | |
| Intensity Result Range [arc height in inches], using Almen strips type A (regular hardness) according to AMS2430 and SAE J443 | | | | | | | | | |
| min | max | min | max | min | max | min | max | | |
| Sucker Rod diameter [in] | | | | | | | | | |
| 5/8" | 0.006 | 0.022 | 0.005 | 0.021 | 0.004 | 0.021 | 0.003 | 0.020 |
| 3/4" | 0.006 | 0.022 | 0.005 | 0.021 | 0.004 | 0.021 | 0.003 | 0.020 |
| 7/8" | 0.007 | 0.023 | 0.006 | 0.022 | 0.005 | 0.022 | 0.004 | 0.021 |
| 1" | 0.007 | 0.023 | 0.006 | 0.022 | 0.005 | 0.022 | 0.004 | 0.021 |
| 1 1/8" | 0.008 | 0.024 | 0.007 | 0.023 | 0.006 | 0.023 | 0.005 | 0.022 |
| 1 1/4" | 0.008 | 0.024 | 0.007 | 0.023 | 0.006 | 0.023 | 0.005 | 0.022 |
| 1 3/8" | 0.009 | 0.025 | 0.008 | 0.024 | 0.007 | 0.024 | 0.006 | 0.023 |
| 1 1/2" | 0.009 | 0.025 | 0.008 | 0.024 | 0.007 | 0.024 | 0.006 | 0.023 |
| 1 5/8" | 0.009 | 0.025 | 0.009 | 0.024 | 0.008 | 0.024 | 0.007 | 0.023 |
| 2" | 0.009 | 0.025 | 0.009 | 0.024 | 0.008 | 0.024 | 0.007 | 0.023 |

*FIG. 6*

PROCESS AND APPARATUS FOR INTEGRATED SUCKER ROD CONDITIONING AND SHOT PEENING

CROSS-REFERENCE TO RELATED APPLICATIONS

This application claims the benefit of U.S. Provisional Appl. No. 63/636,974 filed Apr. 22, 2024, which is incorporated herein by reference in its entirety.

BACKGROUND OF THE DISCLOSURE

In the oilfield industry, many wells use a downhole reciprocating type production pump to lift oil from a borehole to the surface. Rods extend from the surface to the extraction area to enable a pump jack located at the surface to cause reciprocal movement of the rod and bring oil to the surface. These rods are known as sucker rods or pump rods and are typically between 25 and 40 feet in length, and threaded at both ends. Sometimes the sucker rods are made of fiberglass with metal end fittings and are typically 37.5 feet in length.

For various reasons, such as wear and tear, the sucker rods must be removed and replaced from time to time. Typically, upon removal, the metal sucker rod is subjected to various forms of inspection, reconditioning and or remanufacturing. In this manner, a used metal sucker rod can be safely returned to service.

Typically the main process of reclaiming or reconditioning a used metal rod utilized in oil pump wells comprises obtaining the rod, cleaning the rod to remove contaminates from use in oil extraction, performing a visual inspection of the rod body, the end fitting, gauging of the end fitting, and gauging the end threads after thread coupling has been removed to determine if the rod should be reconditioned.

Sucker rods returned from field service (and even those sucker rods manufactured in a facility) can have surface impurities on them. The severity and kind of impurities presented on sucker rods can vary tremendously depending on the process used to manufacture the rod or depending on the field application for which the rod has been used.

During a manufacturing process, the sucker rod is heat treated, which forms byproducts, such as high-temperature oxides (scale). The scale presents as an irregular impurity throughout the surface of the manufactured sucker rod. Historically, shot blasting is used to remove these oxides. Now, some manufacturers skip the shot blasting step because the peening operation will also clean the rod. The type of machine used for this peening operation is a Rotating Wheel Impeller Machine, which is effective for processing large parts cost-effectively.

Shot blasting and shot peening both involve shooting a stream of material against the surface of the rod. The primary difference between shot blasting and shot peening lies in the results achieved. Shot blasting uses abrasives to clean or smooth the surface to prepare it for processing. The shot blasting is an uncontrolled process because the surface of the rod is mainly evaluated for the quality of the cleaning achieved. There is no evaluation of the intensity used. By contrast, shot peening creates a required compressive residual stress to prolong the life of the sucker rod. The shot peening is a strictly quality-controlled process (e.g., media evaluation, intensity, and coverage determined per part). In shot peening, each shot acts as a ball-peen hammer. The process makes the surface of the metal sucker rod stronger and more resistant to cracks, fatigue, and corrosion.

In the case of sucker rods used in field applications, the nature of the impurities is vastly variable, from corrosion deposits to asphaltene, or paraffin deposits to oil residue. The severity of these deposits is hard to predict and may require different methods to remove the deposits before proper inspection or remanufacturing processes can be performed.

The issue with shot peening using rotating wheel impeller machines applied in sucker rod applications is that they have to be built for either blasting or peening, and they count on single or multiple wheels to process the sucker rod passing through, in either mode, blasting or peening. So, if the aim is to do shot peening, and the surface of the sucker rod has impurities, some portion of the shot peening process will go into removing them dampening the shot peening intensity and penetration, compromising the resultant compressive residual stress.

As expected, the condition of a sucker rod's surface can alter the effective amount of energy the steel cast shot imparts to the surface during a shot peening process. Accordingly, the surface of the sucker rod is preferably as clean as possible before a shot peening process is performed on a sucker rod in either a manufacturing or a remanufacturing process.

SUMMARY OF THE DISCLOSURE

According to the present disclosure, a machine to treat sucker rods comprises a controller, a chamber, handling equipment, conditioning equipment, and shot peening equipment. The handling equipment is configured to handle the sucker rods in the chamber of the machine. The conditioning equipment is in operational communication with the controller and is configured to condition unconditioned surfaces of the sucker rods in a conditioning process to produce conditioned surfaces. The conditioning equipment has one or more first media accelerators configured to impart media of a defined type and a defined size at a first intensity at the sucker rods in the chamber. The shot peening equipment is in operational communication with the controller and is configured to shot peen the conditioned surfaces of the sucker rods in a shot peening process following the conditioning process. The shot peening equipment has one or more second media accelerators configured to impart the media of the defined type and the defined size at a second intensity at the sucker rods in the chamber. The second intensity is greater than the first intensity.

According to the present disclosure a method to treat sucker rods comprises: handling the sucker rods in a machine; conditioning unconditioned surfaces of the sucker rods in a conditioning process to produce conditioned surfaces by imparting media of a defined type and a defined size at a first intensity at the sucker rods using one or more first media accelerators operated in the machine; and shot peening the conditioned surfaces of the sucker rods in a shot peening process following the conditioning process by imparting the media of the defined type and the defined size at a second intensity at the sucker rods using one or more second media accelerators in the machine, the second intensity being greater than the first intensity.

The foregoing summary is not intended to summarize each potential configuration or every aspect of the present disclosure.

BRIEF DESCRIPTION OF DRAWINGS

FIG. 6 illustrates a chart of example shot peening intensity ranges for several dimensions and grades of sucker rods according to the present disclosure.

DETAILED DESCRIPTION OF THE DISCLOSURE

Figure 1:
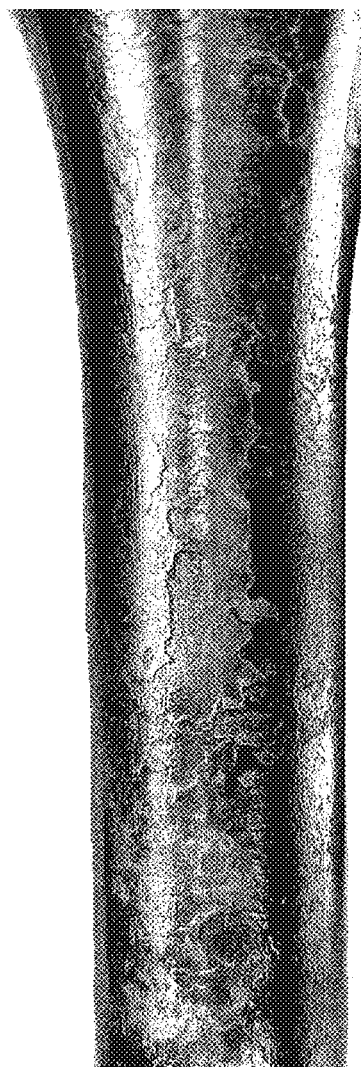
FIG. 1 illustrates examples of manufactured rods going through manufacturing steps.
Figure 1:
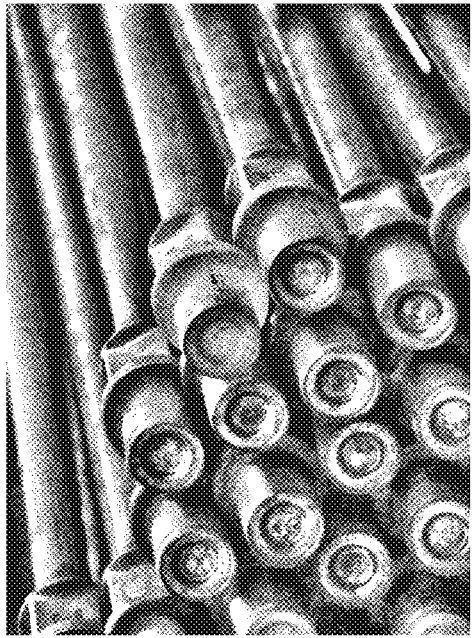
Figure 1:

The sucker rods described herein may include used rods as well as recently manufactured rods. As shown in FIG. 1, for example, manufactured rods 10 go through a forging process to forge the endpieces on the ends of the rods. Heat treatment of the rods is also performed for strengthening. Surface scale, such as high-temperature oxide scale, often forms on the manufactured sucker rods 10 after cooling. Further processing according to the present disclosure is performed on the manufactured rods 10 to prepare them for use and deployment in a well.

Figure 2:
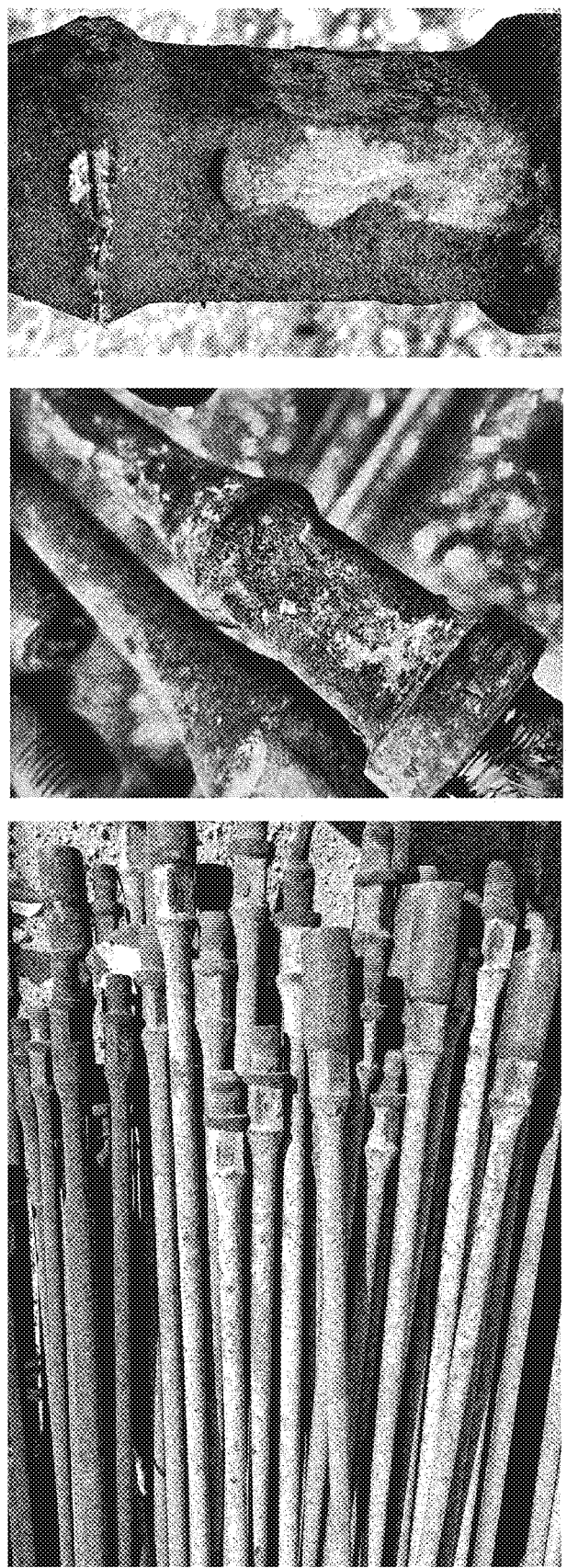
FIG. 2 illustrates example conditions of used sucker rods.

The sucker rods 10 described herein may also include used rods removed from wellbores and transported to a facility. Apart from the various forms of mechanical damage that may be encountered, the used rods 10 can have rust, scale, asphaltene, paraffin, oil residue, mud, and any other number of impurities, such as shown in FIG. 2. Accordingly, the used rods 10 are subjected to a cleaning process. For example, the used rods 10 can be cleaned in a hot kerosene bath to remove paraffin, grease, and other foreign materials. Additionally, the used rods 10 can be subjected to pressure washing with water, organic solvents, cryogenic liquids, or dry ice to remove additional paraffin, grease, other residue, and kerosene from the rods. Visual and non-visual inspections can be performed on the used rods 10 to determine if they are fit for reconditioning. Visual inspection can find any visual damage. The non-visual inspection can use magnetic flux leakage inspection in which a magnetic coil and a detector assembly inspect the used rods 10 to find flaws or damage. Inspection may also include confirming whether the dimensions of the used rods 10 are out-of-conformance or have discontinuities. Additional details of sorting and inspecting the used rods 10 are disclosed in U.S. Pat. No. 7,985,938, which is incorporated herein by reference. Newly manufactured rods 10 may also go through some of these forms of cleaning and inspection.

Figure 3A:
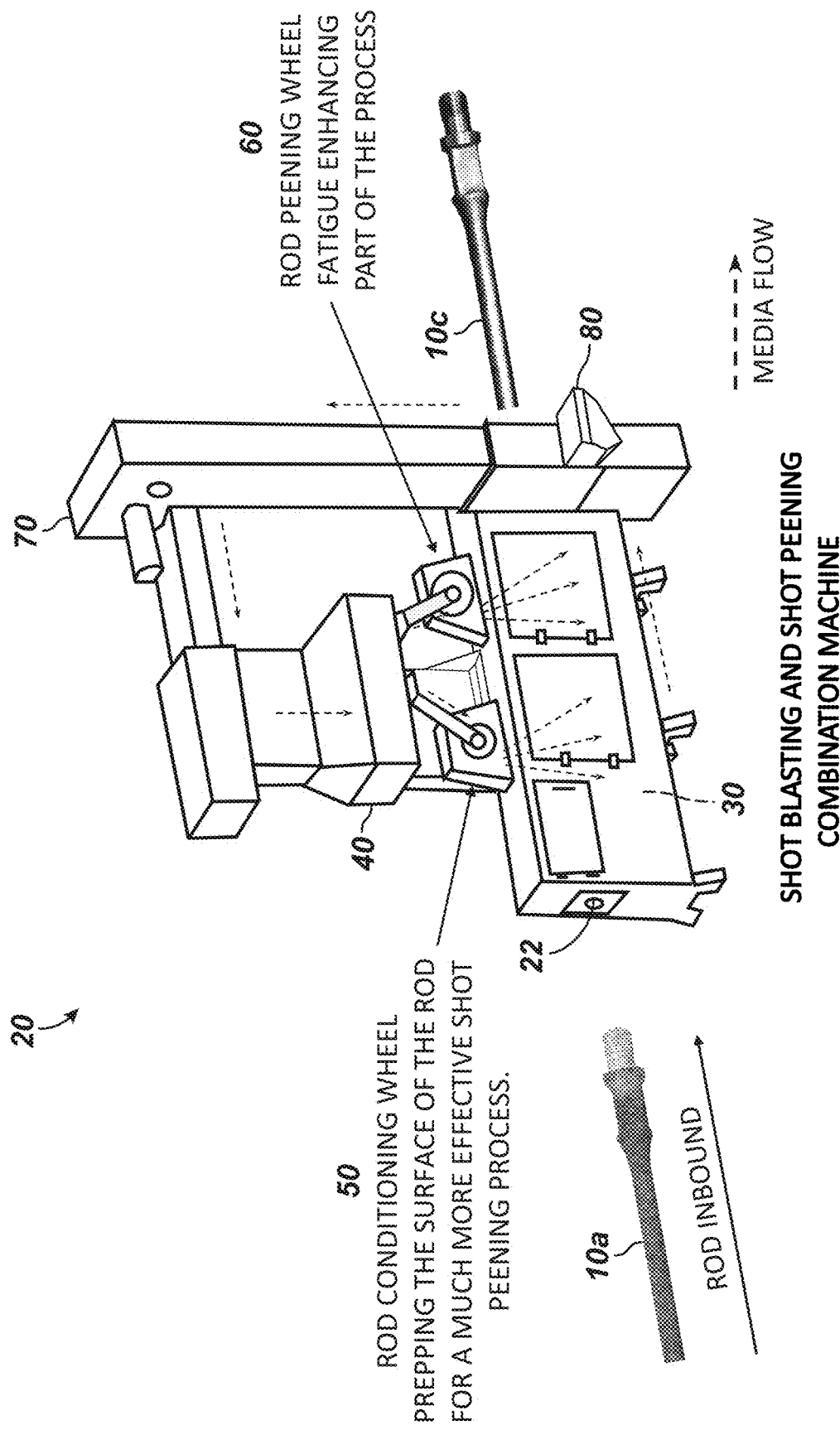
FIG. 3A illustrates a machine to treat sucker rods according to the present disclosure.
Figure 3B:
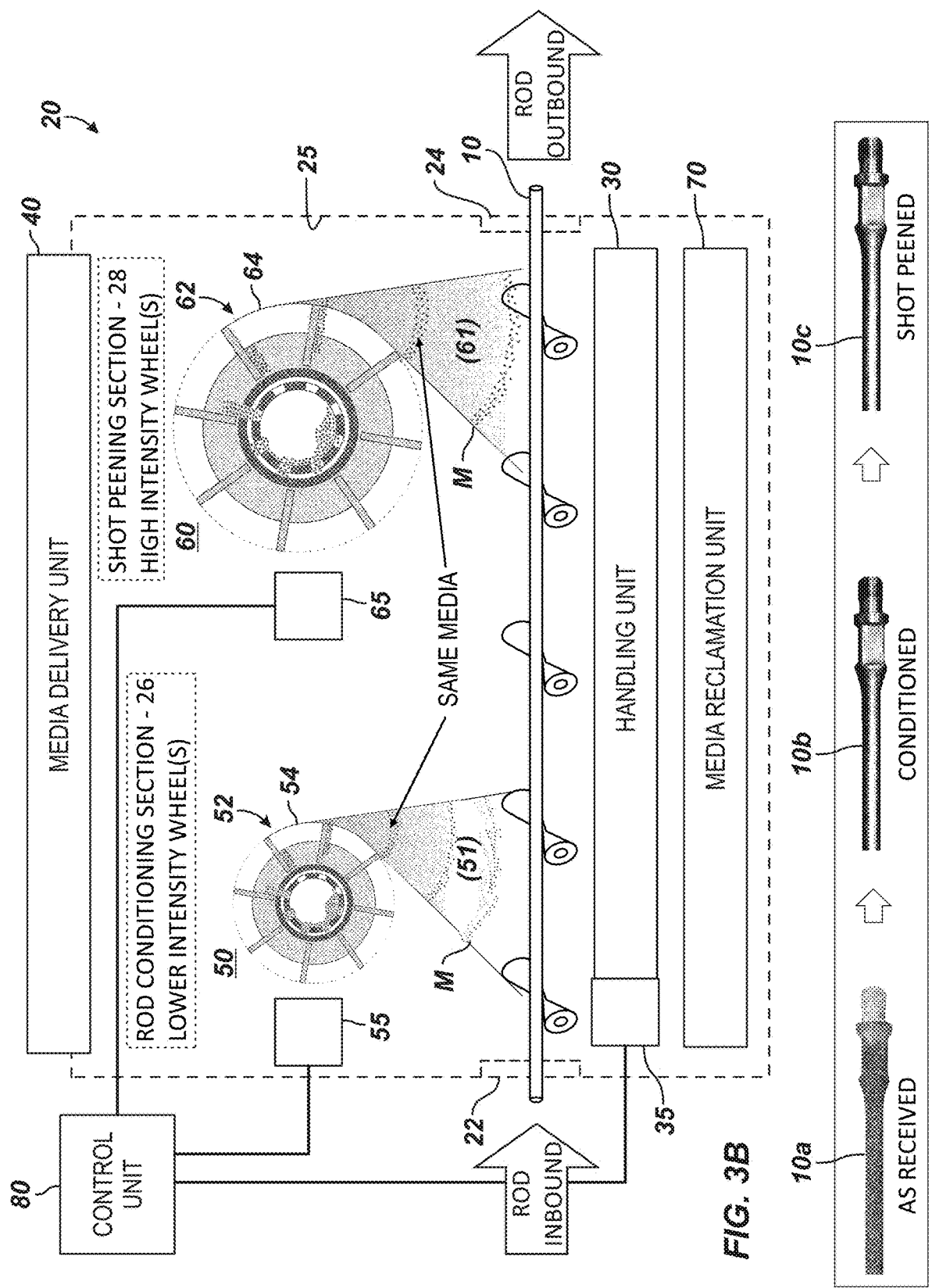
FIG. 3B schematically illustrates the machine to treat sucker rods according to the present disclosure.

The sucker rods 10 (either recently manufactured or used) are then fed into a machine according to the present disclosure to perform conditioning and shot peening of the sucker rods 10. In particular, FIG. 3A illustrates a machine 20 to treat sucker rods 10 according to the present disclosure, and FIG. 3B schematically illustrates components of the machine 20. The machine 20 combines together a rod conditioning process (51) and a shot peening process (61).

The disclosed machine 20 can perform the integrated conditioning and shot peening processes (51, 61) on newly manufactured sucker rods 10 exiting a heat treatment process in a new manufacturing facility. Likewise, the disclosed machine 20 can perform the integrated conditioning and shot peening processes (51, 61) on used sucker rods coming back from being in field use. This same machine 20 and the integrated processes (51, 61) can be used to process continuous sucker rods, or any other long in-line shot peened component that needs to be conditioned before being shot peened.

The machine 20 includes a blast chamber 25, handling equipment 30, a media delivery equipment 40, conditioning equipment 50, shot peening equipment 60, a media recovery equipment 70, and a controller 80. Although not shown, the machine 20 can also likely include features to collect dust and debris, among other common elements.

The blast chamber 25 can be a unitary chamber without a division, such as a dividing wall or the like. Alternatively, the blast chamber 25 can be a divided chamber having at least two divisions. For example, one division of the blast chamber 25 can hold a conditioning section or stage 26 and can be divided by a wall or the like for another division of the blast chamber 25 holding a shot peening section or stage 28 of the machine 20. In either case, the machine 20 is preferably a unitary machine that integrates the conditioning and shot peening processes (51, 61) together for better efficiency.

The handling equipment (e.g., handling unit) 30 can be a motorized mechanism, using motorized rollers, grippers, conveyor, or the like, although a manual loading and unloading mechanism can be used. The handling unit 30 positions the sucker rods 10 within the blast chamber 25 of the machine 20, and the handling unit 30 may be capable of moving/manipulating the sucker rods 10 to ensure even coverage by the conditioning and shot peening units 50, 60.

The media delivery equipment (e.g., media delivery unit) 40 can store and deliver the media M (e.g., steel shot, ceramic beads, etc.) to be imparted in the blast chamber 25. For example, the media delivery unit 40 can have a hopper and/or a reservoir that stores the media M, and controlled mechanisms feed the media M into the blast chamber 25 so the conditioning and shot peening units 50, 60 can accelerate and direct the media M towards the sucker rods 10.

The media recovery equipment (e.g., media recovery unit) 70 can recover and recycle the media M by collecting the spent media M, separating it from any debris or dust, and recycling the media M back to the media delivery unit 40 for reuse. For example, the media recover unit 70 can use an elevator or lift to bring the recovered media M back into the hopper or reservoir of the media deliver unit 40.

The controller (e.g., control unit) 80, which can include a programmable logic controller (PLC), computer, or the like, regulates the flow and velocity of the media M, the duration of the conditioning and shot peening processes (51, 61), and other parameters. The control unit 80 can be in control communication with drives of the machine 20, such as the drive(s) 35 for the handling unit 30, the drive(s) 55 for the conditioning unit 50, the drive(s) 65 for the shot peening unit 60, and the like.

The conditioning equipment (e.g., conditioning unit) 50 can have one or more media accelerators 52 (i.e., conditioning accelerators) to accelerate the media M and impart the accelerated media M against the rod surfaces in a conditioning process (51). The one or more conditioning accelerators 52 can be air blast systems, centrifugal wheel systems, or the like. For example, as air blast systems, the one or more conditioning accelerators 52 can perform pneumatic blasting by propelling the peening media M (e.g., steel shot, ceramic beads, etc.) with compressed air jets toward the rod surfaces. Pressure, angle, and flow rate can be controlled by the control unit 80 to produce the conditioning desired. As centrifugal wheel systems, a rotating mechanical wheel can propel the media M onto the rod surfaces to deliver consistent impacts. Slurry blasting can also be used by mixing water with the media M to reduce friction and prevent surface heating. The one or more conditioning accelerators 52 can also use robotics to programmably direct the media M at precise angles and pressures at the rod surfaces.

As shown in the example of FIG. 3B, one or more conditioning wheels 54 can be disposed in the machine 20 toward the inlet 22 and positioned adjacent to the handling unit 30. The one or more conditioning wheels 54 are operated to prepare the surface of the rod 10 in the conditioning process (51) so the following shot peening process (61) can be more effective. Although one such wheel 54 may be shown and described, the machine 20 may have one or more such wheels 54 that may perform the rod conditioning on the sucker rods 10 passing through the machine 20. For example, multiple conditioning wheels 54 can condition in series with one another on portions of the sucker rods 10, and/or they may perform the rod conditioning in conjunction with one another at different orientations.)

The shot peening equipment (e.g., shot peening unit) 60 can have one or more media accelerators 62 (i.e., shot peening accelerators) to accelerate the media M and impart the accelerated media M against the rod surfaces in the shot peening process (61). The one or more shot peening accelerators 62 can be the same type of device as or a different type of device from the one or more conditioning accelerators 52. Again, the one or more shot peening accelerators 62 can be air blast systems, centrifugal wheel systems, or the like. For example, as air blast systems, the one or more shot peening accelerators 62 can perform pneumatic blasting by propelling the media M (steel shot, ceramic beads, etc.) with compressed air jets toward the rod surfaces. Pressure, angle, and flow rate can be controlled by the control unit 80 to produce the shot peening desired. As centrifugal wheel systems, a rotating mechanical wheel can propel the media M onto the rod surfaces to deliver consistent, high-energy impacts. Slurry blasting can also be used by mixing water with media M to reduce friction and prevent surface heating. The one or more shot peening accelerators 62 can also use robotics to programmably direct the media M at precise angles and pressures.

As shown in FIG. 3B, for example, one or more shot peening wheels 64 can be disposed in the machine 20 toward the outlet 24, following the one or more conditioning wheels 54, and positioned adjacent the handling unit 30. The one or more shot peening wheels 64 performs the shot peening process (61) on the sucker rods 10 to enhance the fatigue resistance. Although one such wheel 64 may be shown and described, the machine 20 may have one or more such wheels 64 that may perform the shot peening on the sucker rods 10 passing through the machine 20. For example, multiple shot peening wheels 64 can condition in series with one another on portions of the sucker rods 10, and/or they may perform the shot peening in conjunction with one another.

Both the conditioning and shot peening processes (51, 61) performed by the units 50, 60 use the same media M (i.e., same type and same size of media) to impact the surfaces of the sucker rods 10. Additionally, the conditioning and shot peening processes (51, 61) by the units 50, 60 are performed according to determined intensities and specified coverages, which are coordinated to achieve the treatment's purposes of the sucker rods 10 based on the same type and size of the media M. The conditioning unit 50 is operated at a lower intensity compared to the shot peening unit 60, which is operated at higher intensity. In both the conditioning and shot peening processes (51, 61) using the same type and size of the media M, the parameters that can control the intensity and/or coverage can include media flow rate (lbs/min), wheel speed (RPM), linear speed (ft/min) used by the handling unit 30 (e.g., conveyor or the like) to handle the sucker rods 10, and other configurable or controllable variables. These parameters can make up the "recipes" that produce the determined intensities and specified coverages for the conditioning and shot peening processes (51, 61) of the sucker rods 10.

Figure 4A:
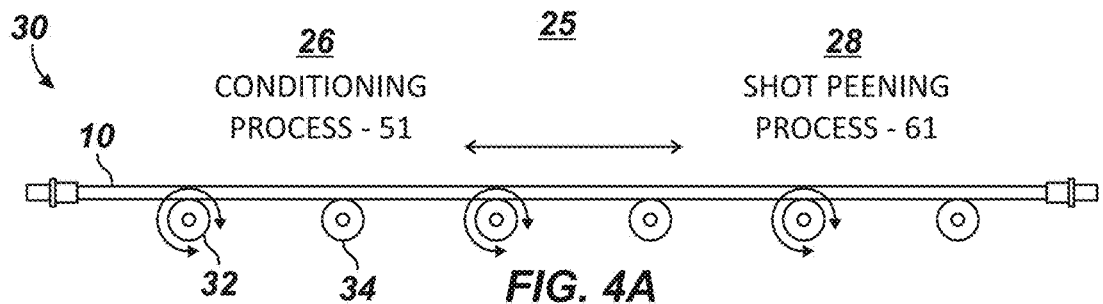
FIGS. 4A-4C schematically illustrate configurations for a handling unit of the disclosed machine.
Figure 4B:
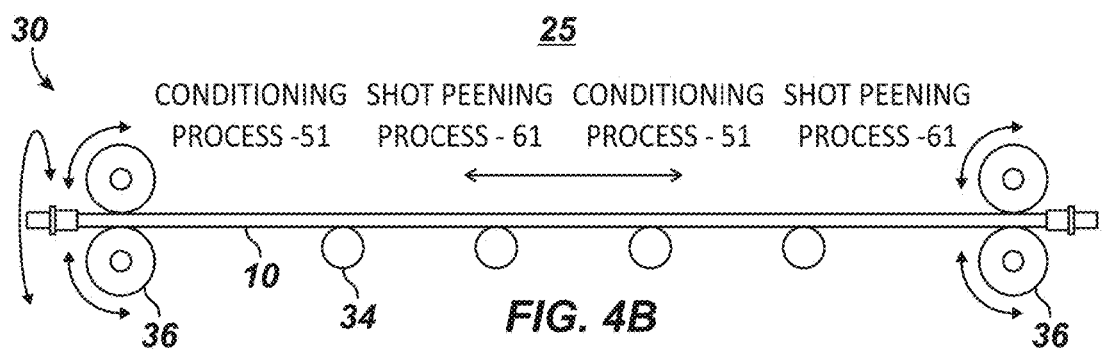
Figure 4C:
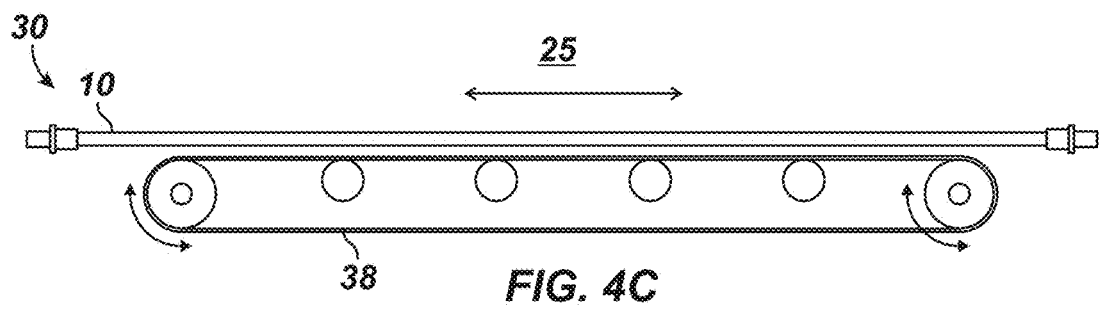

As noted above, the handling unit 30 can be a motorized mechanism, having motorized rollers, grippers, conveyor, or the like. FIGS. 4A-4C schematically illustrate components of the handling unit 30 that can be used in the blast chamber 25 of the machine (20) to move the sucker rods 10. In FIG. 4A, the handling unit 30 includes a plurality of rollers. At least some of the rollers can be motorized rollers 32 while others may be idler rollers 34. The motorized rollers 32 can control the direction and speed at which the sucker rods 10 are moved through the machine's chamber 25 relative to the processes (51, 61).

In FIG. 4B, the handling unit 30 includes motorized grippers 36 and a plurality of rollers 34 that can be used in the machine's blast chamber 25 to move the sucker rods 10. The motorized gripper 36 can use a pair of pinch rollers that grip opposite sides of the sucker rods 10 to control its movement. The pinch rollers of the grippers 36 can have grooves (e.g., V-grooves) to accommodate the cylindrical shape of the sucker rods 10. The motorized grippers 36 can push/pull the sucker rods 10, and the orientation of the grippers 36 can be turned to rotate the sucker rods 10 about their longitudinal axis inside the blast chamber 25.

In FIG. 4C, the handling unit 30 includes a conveyor 38 to move the sucker rods 10. The conveyor 38 can use chain-driven rollers to move the sucker rods 10 in the chamber 25. Alternatively, as shown here, the conveyor 38 can be a flat belt conveyor having a belt surface for moving the sucker rods 10 along a flat path.

In each of these examples, the handling unit 30 can include rail guides, centering blocks, and the like (not shown) to keep the sucker rods 10 aligned and to prevent bending or sagging. The motorized mechanism of the handling unit 30 can move the sucker rods longitudinally in one direction from one end of the chamber 25 to the other relative to the conditioning process (51) and the shot peening process (61). The speed (i.e., length per unit time) at which the sucker rods 10 are moved can be a controllable variable set by the control unit 80, as discussed below. Alternatively, the motorized mechanism of the handling unit 30 may be able to stop the movement of the sucker rods 10 to expose its surfaces to the processes (51, 61). Moreover, the motorized mechanism of the handling unit 30 may be able to operate in opposing directions to move the sucker rods longitudinally back and forth in the blast chamber 25 relative to the processes (51, 61).

In any of the arrangements, the processes (51, 61) can be arranged in separate sections 26, 28 of the machine's chamber 25, such as noted previously and as shown in FIG. 4A. In this instance, the conditioning process (51) in the first section 26 imparts the media (M) at the conditioning intensity at the sucker rod 10 as the sucker rod 10 is fed into the chamber 25. The advancing sucker rod 10 with the conditioned surfaces then passes to the second section 28, and the shot peening process (61) imparts the media (M) at the shot peening intensity at the sucker rod 10, as the sucker rod 10 leaves the chamber 25.

Alternatively, the processes (51, 61) can be distributed in the machine's chamber 25, as shown in FIG. 4B. In this instance, the conditioning process (51) can be performed for an initial time period as the sucker rod 10 is fed into and moved back and forth in the chamber 25. The shot peening process (61) can then be performed at a subsequent time period while the sucker rod 10 is moved back and forth in the chamber 25 and while the conditioning process (51) is stopped. Further impacts can be provided during the shot peening process (61) by also operating the conditioning process (51) at the same time as the shot peening process (61). Yet, according to the teachings disclosed herein, the conditioning process (51) is operated to initially condition the surfaces of the sucker rod 10 so the shot peening process (61) can subsequently treat the conditioned surfaces of the sucker rod 10.

Figure 5A:
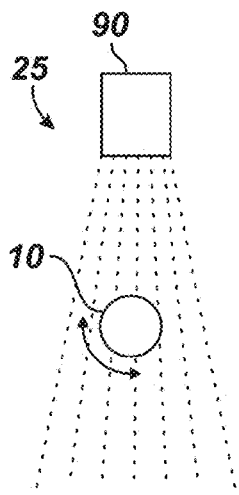
FIGS. 5A-5C schematically illustrate arrangements for accelerator sources for the handling unit of the disclosed machine.

As noted above, the handling unit 30 can move/manipulate the sucker rods 10, and the machine (20) can operate to produce even coverage for the conditioning and shot peening processes 51, 61. For example, FIG. 5A schematically illustrates an end view of a sucker rod 10 relative to an accelerator source 90 directed at the sucker rod 10 to perform one of the subject conditioning/shot peening processes. The handling unit 30 can rotate the sucker rod 10 relative to the accelerator source 90 to increase coverage of the subject process.

Figure 5B:
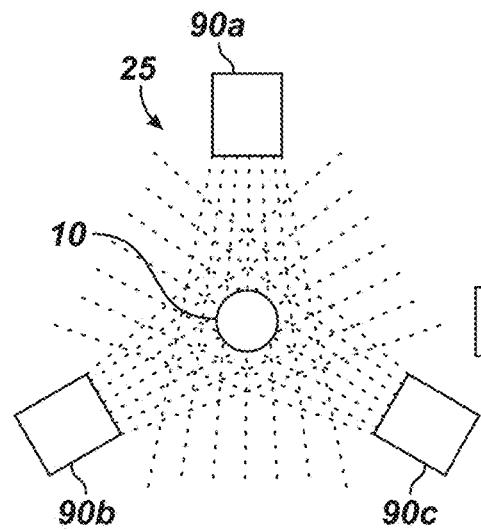

As schematically shown in FIG. 5B, more than one accelerator source 90a-c at different orientations can be directed at the sucker rod 10 to increase coverage of the subject process. Here, three accelerator sources 90a-c are arranged at 120-degrees about the sucker rod 10, but more or fewer accelerator sources 90a-c can be used and can be arranged at any number of acceptable orientations.

Figure 5C:
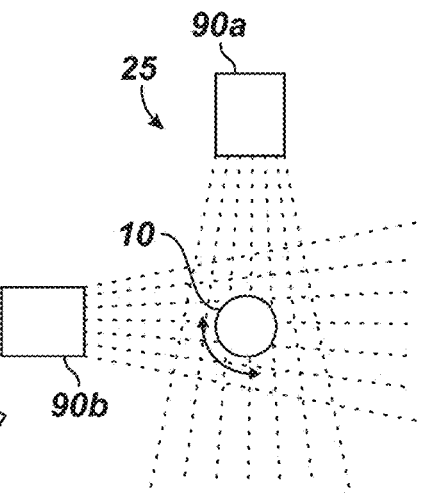

Additionally, FIG. 5C shows how multiple accelerator sources 90a-b can be used in conjunction with rotation of the sucker rod 10 to increase coverage for the subject process.

As noted above, both the conditioning and shot peening processes (51, 61) use the same media M to impact the surfaces of the sucker rods 10, but the shot peening process (61) uses a shot peening intensity that is greater than the conditioning intensity of the conditioning process (51). For further understanding, example shot peen intensity results are provided in the chart of FIG. 6 for various sucker rod diameters and grades. The examples are listed for sucker rods having diameters ranging from ⅝ in. to 2 in. For each of the listed diameters, the shot peen intensity results are provided for four sucker rod grades (Grade 1, 2, 3, and 4), which are divided according to ranges of hardness grades given in Rockwell C reference (HRC) according to ASTM E18-22.

The shot peen intensity results are provided in ranges of minimum and maximum shot peens produced on the respective sucker rods using the shot peening process (61) according to the disclosed techniques. The values for the minimum and maximum shot peens are given in arc height (inches) using Almen strips type A (regular hardness) according to AMS2430 and SAE J443. The conditioning process (51) can be controlled to have lower intensity, producing results that range from about 5% to 50% of the results of the shot peening process (61).

As discussed herein, process parameters providing process intensity of the shot peening process (61) can include media (e.g., type and size), media flow rate (lbs/min), wheel speed (RPM), linear speed (ft/min) used to handle the sucker rod, and the like. The shot peening process' parameters are configured to produce the example shot peen intensity results listed in FIG. 6. As a corollary, the conditioning process' parameters include the same media (e.g., type and size), but include differences in one or more of media flow rate (lbs/min), wheel speed (RPM), linear speed (ft/min), or the like. The conditioning process' parameters are configured to produce condition intensity results that are about 5% to 50% of the shot peen intensity results listed in FIG. 6.

As one example, for a sucker rod of Grade 2 (22-30 HRC) having a 1-in. diameter, the shot peen intensity result can have an arc height ranging from about 0.006 to 0.022 in. According to the corollary, the condition intensity result can have "theoretical" results that range from between 0.0003 to 0.0011 in. (5%) and 0.003 to 0.011 in. (50%). As will be appreciated, the "theoretical" results may not actually be produced and may not even be measurable. Instead, the conditioning process' parameters are calculated and controlled to at least theoretically produce such "theoretical" results as compared to the example shot peen intensity results shown here. Yet, the conditioning process (51) is designed to condition the rod surfaces for the shot peening.

Returning to FIGS. 3A-3B, the shot peening process (61) can increase the fatigue strength of the sucker rods 10. To do this, the shot peening process (61) imparts (bombards) the surface of the sucker rod 10 with the small media (shots) M at high velocity. The impacts create a compressive residual stress layer and modify the mechanical properties of the material of the sucker rods 10. The types and sizes of media M used in the shot peening process (61) can be selected to meet desired surface characteristics and to provide a defined surface finish and strength.

The types of media M that can be used include steel shot, glass beads, ceramic beads, and cut wire shot. Steel shot, being the most common media used for shot peening sucker rods, can have sizes ranging from about S70 (very fine) to S780 (coarser) measured in screen mesh. Glass beads can provide a less aggressive peening action than steel shot and can be effective in cleaning and slightly peening the surface without removing much material. Ceramic beads can be harder and can have a more consistent size and shape compared to glass beads. Therefore, the ceramic beads can provide more control in the peening process. The ceramic beads are harder and more consistent in size and shape compared to glass beads, offering a uniform peening action. Finally, cut wire shot consists of cylindrical particles formed by cut wire having lengths about equal to the wire diameter. The cut wire shot can be made of steel, stainless steel, or other metals and can provide a consistent, repeatable peening action.

The size of the media M defines aspects of the intensity and coverage of the shot peening process (61), and by corollary, the intensity and coverage of the conditioning process (51). As expected, smaller media M can provide a smoother finish but may require more time to achieve the desired level of residual stress. Also, larger media M can cover a larger surface area more quickly but might not provide a desired finish.

Accordingly, the media M used for shot peening the sucker rods 10 is selected based on coverage, intensity, the material of the sucker rods 10, the desired finish, and the desired level of residual stress to be produced. Because the media M is also used for the conditioning process (51) by the conditioning unit 50, the media M is also selected to not only meet the requirements of the shot peening process (61), but also to meet intensity, coverage, the surface conditions of the sucker rods 10 to be conditioned.

As noted in the background of the present disclosure, shot peening using a standard machine can perform only blasting or peening to process the sucker rods passing through the machine. Thus, to perform shot peening on sucker rods having surface impurities, some portion of the shot peening goes into removing the impurities, which dampens the shot peening intensity, reduces the shot peening penetration, and compromises any resultant compressive residual stress achieved.

In summary, the machine 20 disclosed herein, however, includes two processes to treat the sucker rods 10. The first process performs rod conditioning, which can be performed in a first section 26 having a conditioning unit 50, to condition unconditioned surface of the sucker rods. The second process performs shot peening, which can be performed in a second section 28 having a shot peening unit 60 on the conditioned surface, to produce a surface finish and fatigue strength. The rod conditioning is performed by one or more conditioning accelerators 52 or wheels 54 operated with lower intensity—i.e., lower available kinetic energy than the shot peening process (61) of the machine 20. The rod conditioning process (51) is configured to remove any surface impurities before the shot peening process (61).

The shot peening is performed by one or more shot peening accelerators 62 or wheels 64, which are operated with the desired intensity, higher than the intensity of the conditioning process (51). This shot peening process (61) has a quality/performance requirement associated with a determined intensity and saturation value. For example, the quality/performance requirements for the shot peening of the sucker rods 10 can be defined by the specifications AMS2430 and SAE J443. The coverage for the shot peening of the sucker rods 10 may provide a minimum coverage (e.g., 98% of "full" coverage), such as defined in the specification AMS 2430 and SAE J2277.

The media M in use for the rod conditioning process (51) is the same as that used in the shot peening process (61). Accordingly, only one single size and type of media M is used for both rod conditioning and shot peening in the machine 20. This makes the machine 20 much less expensive and easier to implement. Moreover, the quality control and reclamation process for the media M can comply with the requirements of the shot peening process (61).

The combined machine 20 and processes (51, 61) provides a number of advantages. The disclosed machine 20 and processes (51, 61) prevent the shot peening intensity (available energy) from being wasted in cleaning the sucker rods 10 instead of creating the desired residual compressive stress on the rod's surface. The combined machine 20 and processes (51, 61) allow conditioning and peening to be performed with less equipment. Additionally, using a single media M for both processes (51, 61) can simplify the media reclamation and handling equipment, making them more cost-effective.

Figure 7:
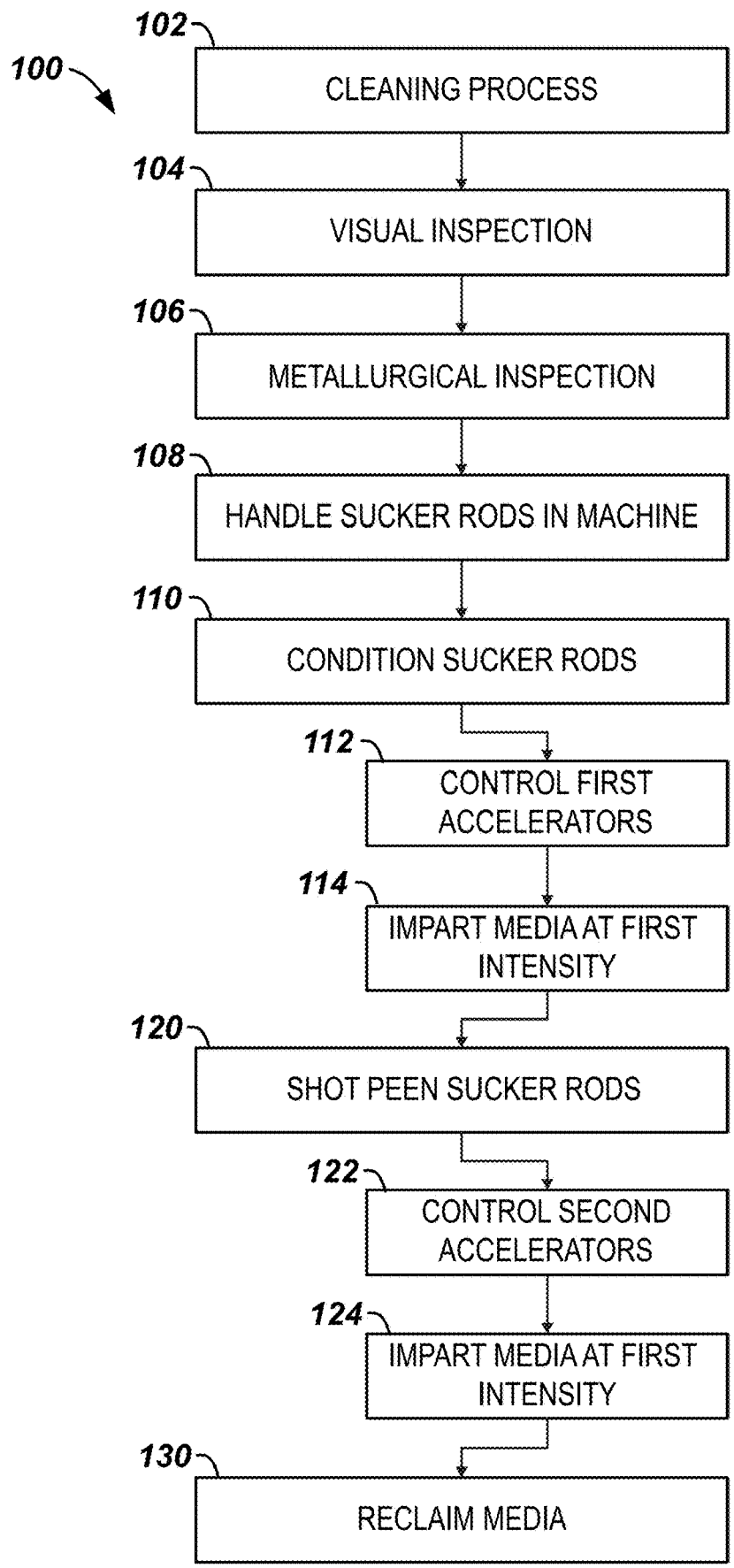
FIG. 7 illustrates a process to treat sucker rods according to the present disclosure.

FIG. 7 illustrates a process 100 to treat sucker rods 10 according to the present disclosure. The process 100 can include initially cleaning the sucker rods 10 (e.g., recently manufactured and/or used rods) in a cleaning process (Block 102). Visual inspection can be performed of the sucker rods 10 to detect any damage (Block 104). Metallurgical inspection of the metallic material of the sucker rods 10 can also be performed to detect any defects that may not be visible (Block 106). Damaged sucker rods 10 that cannot be repaired can be discarded.

With the sucker rods 10 ready to be treated, the sucker rods 10 are handled in a machine to treat the sucker rods 10 (Block 108). For example, the machine 20, such as disclosed above with reference to FIGS. 3A-3B, can be used. Handling the sucker rods 10 in the machine 20 can be performed by robotically moving the sucker rods 10 in the machine 20. A conveyor, robotic mechanism, or other type of motorized mechanism can be used for the handling unit 30.

Surfaces of the sucker rods 10 are conditioned in a conditioning process (51) to produce conditioned surfaces (Block 110). The control unit 80 controls one or more first media accelerators 52 operated in the machine 20 (Block 112) to impart media M of a defined type and size at a first intensity at the sucker rods 10 (Block 114). The conditioned surfaces of the sucker rods 10 are then shot peened in a shot peening process (61) in the machine 20 (Block 120). The control unit 80 controls one or more second media accelerators 62 operated in the machine 20 (Block 122) to impart the media M of the same defined type and defined size at a second intensity at the sucker rods 10 (Block 124). The second intensity is greater than the first intensity.

There are several features of the media accelerators 52, 62 that can provide the different intensities required for the conditioning and shot peening processes (51, 61). One or more of the following aspects can be used alone or in combination to achieve the purposes of the present disclosure. As noted, the one or more first media accelerators 52 can include one or more first wheels 54 driven by drive(s) 55 in the conditioning unit 50, and the one or more second media accelerators 62 can include one or more first wheels 54 driven by drive(s) 65 in the shot peening unit 60.

In one aspect, more shot peening wheels 64 can be used compared to the conditioning wheels 54 to achieve a greater intensity. Therefore, additional amounts of media M can be imparted by the shot peening wheels 64 compared to the conditioning wheels 54 with all other parameters being equal. In additional aspects, the shot peening wheels 64 can have a larger diameter than the conditioning wheels 54 to produce a greater media velocity, the shot peening wheels 64 can be rotated at a faster rotational speed than the conditioning wheels 54 to produce a greater media velocity, and/or the shot peening wheels 64 can be fed and impart a greater amount of media M than the conditioning wheels 54 to produce more impacts. In this way, the shot peening wheels 64 can provide increased velocity and/or coverage of the media M imparted against the surfaces of the sucker rods 10.

The media M from the conditioning and shot peening processes (51, 61) is then reclaimed in the machine 20 (Block 130). The reclaimed media from the conditioning and shot peening processes (51, 61) can then be reused in either one or both of the conditioning process (51) and the shot peening process (61).

Figure 8:
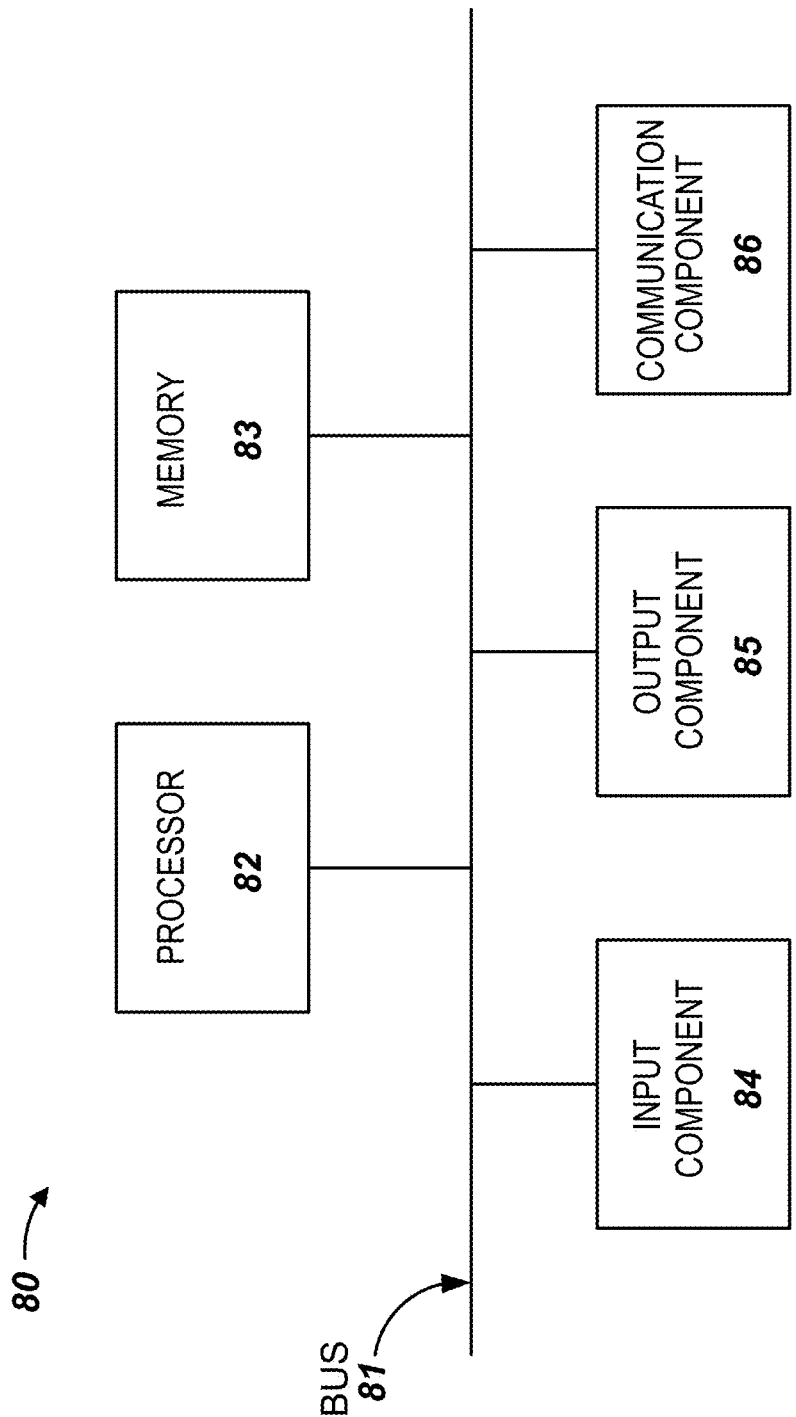
FIG. 8 schematically illustrates components of a control unit according to the present disclosure.

FIG. 8 schematically illustrates components of a processing device or control unit 80 (e.g., central PLC control system), which can correspond to the control unit 80 of FIG. 3B. As shown, the control unit 80 can include a bus 81, a processor 82, a memory 83, an input component 84, an output component 85, and a communication interface 86.

The bus 81 includes one or more components that enable wired and/or wireless communication among the components of the control unit 80. The bus 81 can couple together two or more components of FIG. 3B, such as via operative coupling, communicative coupling, electronic coupling, and/or electric coupling. The processor 82 includes a central processing unit, a graphics processing unit, a microprocessor, a controller, a microcontroller, a digital signal processor, a field-programmable gate array, an application-specific integrated circuit, and/or another type of processing component. The processor 82 is implemented in hardware, firmware, or a combination of hardware and software. In some implementations, the processor 82 includes one or more processors capable of being programmed to perform one or more operations or processes described elsewhere herein.

The memory 83 includes volatile and/or nonvolatile memory. For example, the memory 83 can include random access memory (RAM), read only memory (ROM), a hard disk drive, and/or another type of memory (e.g., a flash memory, a magnetic memory, and/or an optical memory). The memory 83 can include internal memory (e.g., RAM, ROM, or a hard disk drive) and/or removable memory (e.g., removable via a universal serial bus connection). The memory 83 can be a non-transitory computer-readable medium. The memory 83 stores information, instructions, and/or software (e.g., one or more software applications) related to the operation of the control unit 80. In some implementations, the memory 83 includes one or more memories that are coupled to one or more processors (e.g., the processor 82), such as via the bus 81.

The input component 84 enables the control unit 80 to receive input, such as user input and/or sensed input. For example, the input component 84 can include a touch screen, a keyboard, a keypad, a mouse, a button, a microphone, a switch, a sensor, an accelerometer, a gyroscope, and/or an actuator. The output component 85 enables the control unit 80 to provide output, such as via a display, a speaker, and/or a light-emitting diode. The communication interface 86 enables the control unit 80 to communicate with other devices via a wired connection and/or a wireless connection. For example, the communication interface 86 can include a receiver, a transmitter, a transceiver, a modem, a network interface card, and/or an antenna.

The control unit 80 can perform one or more operations or processes described herein. For example, a non-transitory computer-readable medium (e.g., the memory 83) can store a set of instructions (e.g., one or more instructions or code) for execution by the processor 82. The processor 82 can execute the set of instructions to perform one or more operations or processes described herein. In some implementations, execution of the set of instructions, by one or more processors 82, causes the one or more processors 82 and/or the control unit 80 to perform one or more operations or processes described herein. In some implementations, hardwired circuitry can be used instead of or in combination with the instructions to perform one or more operations or processes described herein. Additionally, or alternatively, the processor 82 can be configured to perform one or more operations or processes described herein. Thus, implementations described herein are not limited to any specific combination of hardware circuitry and software.

For instance, the control unit 80 can receive inputs via the input component 84. These inputs can include one or more characteristics associated with the sucker rods (10) to be treated, such as the type of the sucker rods (e.g., new or used) to be treated, a condition of the sucker rod (e.g., type and/or extent of scale, rust, surface impurities, etc.), a material of the sucker rods (e.g., type of steel, hardness grade, etc.), dimensions of the sucker rods (e.g., length, diameter, etc.), and any other details of the sucker rods. The inputs can also include desired results from the treatment of the sucker rods (10), such as desired surface finish, desired fatigue strengthening, and the like.

In one configuration, the processor 82 can also receive inputs that are used to control operation of the machine (20), such as parameters for the type of media (M) being used, the size of the media (M) being used, the intensity of the conditioning process (51) to be performed, and the intensity of the shot-peening process (61) to be performed. The processor 82 can use the inputs to coordinate the conditioning process (51) and the shot peening process (61) by controlling the drives (e.g., 35, 55, 65 of FIG. 3B) to achieve the desired results for the characterized sucker rods (10) being treated.

In another configuration, the processor 82 can use the input characteristics and the input results to select/calculate/determine/configure the operational parameters to control the machine. In an automated process, for example, the processor 82 can select the operational parameters, such as a defined type of media (M) to be used, a defined size of the media (M) to be used, an intensity to be performed in the conditioning process (51), and an intensity to be performed in the shot peening process (61). The selection/calculation/determination/configuration for the operational parameters can be stored in lookup tables, logic, equations, and the like stored in memory 83 and based on calibrated and programmed data. The processor 82 can use these selected parameters as programmable variable to coordinate the conditioning process (51) and the shot peening process (61) by controlling the drives (e.g., 35, 55, 65 of FIG. 3B) to achieve the desired results for the characterized sucker rods (10) being treated.

In both the conditioning and shot peening processes (51, 61) as noted above, some examples of the parameters that can be manipulated and selected to control the intensity and/or coverage include the media flow rate (lbs/min), wheel speed (RPM), and the linear speed (ft/min) used by the handling unit (30) (e.g., conveyor or the like) to handle the sucker rods (10). Each of these parameters can be controlled by the control unit 80.

The number and arrangement of components shown in FIG. 8 are provided as an example. The control unit 80 can include additional components, fewer components, different components, or differently arranged components than those shown in FIG. 8. Additionally, or alternatively, a set of components (e.g., one or more components) of the control unit 80 can perform one or more functions described as being performed by another set of components of the control unit 80.

As used herein, the term "rod" and "sucker rod" can include hollow or solid rods, continuous rods, joints, or the like. The term "rod" can include welded, flanged, screwed, and other rod goods. In particular, joints of sucker rods used in artificial rod lift systems are one type of rod that can benefit from the techniques described herein, but the disclosure is not so limited. As used herein, the term "used rod" and "used sucker rod" can mean a rod that has been in actual service in the filed for a purpose, such as lifting fluids by connecting a downhole pump to a surface driver. As used herein, the term "new rod" and "new sucker rod" can mean a rod that has been manufactured in a facility or can mean a rod that has been previously used but has been remanufactured, reconditioned, or repaired for use again in the field.

Configurations of the present disclosure can be characterized by the following clauses:

Clause 1. A machine (20) to treat sucker rods (10), the machine (20) comprising: a controller (80); a chamber (25); handling equipment (30) being configured to handle the sucker rods (10) in the chamber (25) of the machine (20); conditioning equipment (50) in operational communication with the controller (80) and being configured to condition unconditioned surfaces of the sucker rods (10) in a conditioning process (51) to produce conditioned surfaces, the conditioning equipment (50) having one or more first media accelerators (52) being configured to impart media (M) of a defined type and a defined size at a first intensity at the sucker rods (10) in the chamber (25); and shot peening equipment (60) in operational communication with the controller (80) and being configured to shot peen the conditioned surfaces of the sucker rods (10) in a shot peening process (61) following the conditioning process (51), the shot peening equipment (60) having one or more second media accelerators (62) being configured to impart the media (M) of the defined type and the defined size at a second intensity at the sucker rods (10) in the chamber (25), the second intensity being greater than the first intensity.

Clause 2. The machine (20) of clause 1, wherein the one or more first media accelerators (52) comprise one or more first wheels (54); and wherein the one or more second media accelerators (62) comprise one or more second wheels (64).

Clause 3. The machine (20) of clause 2, wherein the one or more first wheels (54) have a first diameter; and wherein the one or more second wheels (64) have a second diameter, the second diameter being greater than the first diameter.

Clause 4. The machine (20) of clause 2 or 3, wherein the one or more first wheels (54) are rotated at a first rotational speed; and wherein the one or more second wheels (64) are rotated at a second rotational speed, the first rotational speed being greater than the first rotational speed.

Clause 5. The machine (20) of clause 2, 3 or 4, wherein the one or more first wheels (54) impart a first amount of the media (M) within a given time period; and wherein the one or more second wheels (64) impart a second amount of the media (M) within the given time period, the second amount being greater than the first amount.

Clause 6. The machine (20) of any one of clauses 1 to 5, wherein at least one of: the one or more second media accelerators (62) are configured to impart the media (M) at a second speed, the second speed being greater than a first speed imparted by the one or more first media accelerators (52); the one or more second media accelerators (62) are configured to impart a second amount of the media (M) within a given time period, the second amount being greater than a first amount imparted by the one or more first media accelerators (52) within the given time period; the one or more second media accelerators (62) are configured to impart the media (M) for a second time period, the second time period being greater than a first time period for the one or more first media accelerators (52); and a second number of the one or more second media accelerators (62) being greater than a first number of the one or more first media accelerators (52) in the machine (20).

Clause 7. The machine (20) of any one of clauses 1 to 6, wherein the handling equipment (30) comprises a motorized mechanism in operational communication with the controller (80) and being configured to move the sucker rods (10) in the machine (20).

Clause 8. The machine (20) of clause 7, wherein the motorized mechanism comprises a plurality of rollers (32, 34), a pair of grippers (36), or a conveyor (38) in the machine (20).

Clause 9. The machine (20) of any one of clauses 1 to 8, wherein the handling equipment (30) is configured to move the sucker rods (10) at a same length per unit time in both the conditioning process (51) and the shot peening process (61).

Clause 10. The machine (20) of any one of clauses 1 to 9, further comprising a media recovery equipment (70) configured to reclaim the media (M) from the conditioning process (51) and the shot peening process (61) in the machine (20).

Clause 11. The machine (20) of any one of clauses 1 to 10, wherein the controller (80) is configured to coordinate the conditioning process (51) and the shot peening process (61) relative to one or more characteristics of the sucker rods (10).

Clause 12. The machine (20) of clause 11, wherein to coordinate the conditioning process (51) and the shot peening process (61), the controller (80) is programmable based on one or more of: a first parameter selected for the defined type of the media (M), a second parameter selected for the defined size of the media (M), a third parameter selected for the first intensity used in the conditioning process (51), and a fourth parameter selected for the second intensity used in the shot peening process (61).

Clause 13. The machine (20) of clause 11 or 12, wherein to coordinate the conditioning process (51) and the shot peening process (61), the controller (80) is programmable based on a length per unit time selected to move the sucker rods (10) in the machine (20) for both the conditioning process (51) and the shot peening process (61).

Clause 14. The machine (20) of any one of clauses 1 to 13, wherein the controller (80) is configured to coordinate one or more first controllable variables of the conditioning process (51) and one or more second controllable variables of the shot peening process (61) relative to one another for a combination of a plurality of diameters of the sucker rods (10) and a plurality of hardness grades of the sucker rods (10).

Clause 15. The machine (20) of any one of clauses 1 to 14, wherein the controller (80) is configured to one of: perform the conditioning process (51) and the shot peening process (61) at a same time while the handling equipment (30) moves the sucker rods (10) from one end of the machine (20) to another end of the machine (20); and perform the conditioning process (51) for an initial time period followed by the shot peening process (61) at a subsequent time period while the handling equipment (30) handles the sucker rods (10) in the chamber (25).

Clause 16. The machine (20) of any one of clauses 1 to 15, wherein to handle the sucker rods (10) in the chamber (25), the handling equipment (30) is configured to at least one of: move the sucker rods (10) in one direction through the machine (20); move the sucker rods (10) back and forth in the machine (20); and rotate the sucker rods (10) in the machine (20).

Clause 17. The machine (20) of any one of clauses 1 to 16, wherein at least one of: the one or more first media accelerators (52) are directed in a plurality of first directions toward the sucker rods (10); and the one or more second media accelerators (62) are directed in a plurality of second directions toward the sucker rods (10).

Clause 18. A method to treat sucker rods (10), the method comprising: handling the sucker rods (10) in a machine (20); conditioning unconditioned surfaces of the sucker rods (10) in a conditioning process (51) to produce conditioned surfaces by imparting media of a defined type and a defined size at a first intensity at the sucker rods (10) using one or more first media accelerators (52) operated in the machine (20); and shot peening the conditioned surfaces of the sucker rods (10) in a shot peening process (61) following the conditioning process (51) by imparting the media (M) of the defined type and the defined size at a second intensity at the sucker rods (10) using one or more second media accelerators (62) in the machine (20), the second intensity being greater than the first intensity.

Clause 19. The method of clause 18, comprising, before the conditioning process (51) and the shot peening process (61), performing at least one of: cleaning the sucker rods (10); performing a visual inspection of the sucker rods (10); performing an inspection of one or more dimensions of the sucker rods; and performing a metallurgical inspection of the sucker rods (10).

Clause 20. The method of clause 18 or 19, wherein imparting the media (M) at the first intensity comprises rotating one or more first wheels of the one or more first media accelerators (52); and wherein imparting the media (M) at the second intensity comprises rotating one or more second wheels of the one or more second media accelerators (62).

Clause 21. The method of clause 20, wherein at least one of: imparting the media (M) at the first intensity comprises rotating the one or more first wheels having a first diameter, and imparting the media (M) at the second intensity comprises rotating the one or more second wheels having a second diameter, the second diameter being greater than the first diameter; imparting the media (M) at the first intensity comprises rotating the one or more first wheels at a first rotational speed, and imparting the media (M) at the second intensity comprises rotating the one or more second wheels at a second rotational speed, the second rotational speed being greater than the first rotational speed; and imparting the media (M) at the first intensity comprises rotating the one or more first wheels to impart a first amount of the media (M) at the unconditioned surfaces of the sucker rods (10) within a given time period; and wherein imparting the media (M) at the second intensity comprises rotating he one or more second wheels to impart a second amount of the media (M) against the conditioned surfaces of the sucker rods (10) within the given time period, the second amount being greater than the first amount.

Clause 22. The method of any one of clauses 18 to 21, wherein at least one of: imparting the media (M) at the first intensity comprises imparting the media (M) at a first speed against the unconditioned surfaces of the sucker rods (10), and imparting the media (M) at the second intensity comprises imparting the media (M) at a second speed against the conditioned surfaces of the sucker rods (10), the second speed being greater than the first speed; imparting the media (M) at the first intensity comprises imparting a first amount of the media (M) against the unconditioned surfaces of the sucker rods (10) within a given time period, and imparting the media (M) at the second intensity comprises imparting a second amount of the media (M) against the conditioned surfaces of the sucker rods (10) within the given time period, the second amount being greater than the first amount; imparting the media (M) at the first intensity comprises imparting the media (M) against the unconditioned surfaces of the sucker rods (10) for a first time period, and imparting the media (M) at the second intensity comprises imparting the media (M) against the conditioned surfaces of the sucker rods (10) for a second time period, the second time period being greater than the first time period; and imparting the media (M) at the first intensity comprises using a first number of the one or more first media accelerators (52) in the machine (20), and imparting the media (M) at the second intensity comprises using a second number of the one or more second media accelerators (62) in the machine (20), the second number being greater than the first number.

Clause 23. The method of any one of clauses 18 to 22, wherein handling the sucker rods (10) in the machine (20) comprises at least one of: moving the sucker rods (10) in one direction through the machine (20); moving the sucker rods (10) back and forth in the machine (20); rotating the sucker rods (10) in the machine (20); and robotically moving the sucker rods (10) in the machine (20).

Clause 24. The method of any one of clauses 18 to 23, further comprising: reclaiming the media (M) from the conditioning process (51) and the shot peening process (61) in the machine (20); and reusing the reclaimed media in the conditioning process (51) and the shot peening process (61) in the machine (20).

Clause 25. The method of any one of clauses 18 to 24, further comprising coordinating the conditioning process (51) and the shot peening process (61) relative to one or more characteristics of the sucker rods (10).

Clause 26. The method of clause 25, wherein coordinating the conditioning process (51) and the shot peening process (61) relative to one or more characteristics of the sucker rods (10) comprises selecting one or more of: a first parameter of the defined type of the media (M); a second parameter of the defined size of the media (M); a third parameter for the first intensity for the conditioning process (51); and a fourth parameter for the second intensity for the shot peening process (61).

Clause 27. The method of clause 25 or 26, wherein coordinating the conditioning process (51) and the shot peening process (61) relative to the one or more characteristics of the sucker rods (10) further comprises selecting a length per unit time to move the sucker rods (10) in the machine (20) for both the conditioning process (51) and the shot peening process (61).

Clause 28. The method of any one of clauses 18 to 27, further comprising coordinating one or more first controllable variables of the conditioning process (51) and one or more second controllable variables of the shot peening process (61) relative to one another for a combination of a plurality of diameters of the sucker rods (10) and a plurality of hardness grades of the sucker rods (10).

Clause 29. The method of any one of clauses 18 to 28, wherein conditioning the unconditioned surfaces of the sucker rods (10) in the conditioning process (51), and shot peening the conditioned surfaces of the sucker rods (10) in the shot peening process (61) following the conditioning process (51) comprises one of: performing the conditioning process (51) and the shot peening process (61) at a same time while moving the sucker rods (10) from one end of the machine (20) to another end of the machine (20); and performing the conditioning process (51) for an initial time period followed by performing the shot peening process (61) at a subsequent time period while handling the sucker rods (10) in the machine (20).

Clause 30. The method of any one of clauses 18 to 29, wherein at least one of: conditioning the unconditioned surfaces of the sucker rods (10) in the conditioning process (51) comprises directing the one or more first media accelerators (52) in a plurality of first directions toward the sucker rods (10); and shot peening the conditioned surfaces in the shot peening process (61) comprises directing the one or more second media accelerators (62) in a plurality of second directions toward the sucker rods (10).

The foregoing description of preferred and other embodiments is not intended to limit or restrict the scope or applicability of the inventive concepts conceived of by the Applicants. It will be appreciated with the benefit of the present disclosure that features described above in accordance with any configuration or aspect of the disclosed subject matter can be utilized, either alone or in combination, with any other described feature, in any other configuration or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

The invention claimed is:

1. A machine to treat sucker rods, the machine comprising:
   a controller;
   a chamber;
   handling equipment being configured to handle the sucker rods in the chamber of the machine;
   media delivery equipment being configured to deliver media of a defined type and a defined size;
   conditioning equipment in operational communication with the controller and receiving the media from the media delivery equipment, the conditioning equipment being configured to condition unconditioned surfaces of the sucker rods in a conditioning process in the chamber, the conditioning process being configured to remove impurities from the unconditioned surfaces to produce conditioned surfaces without penetrations imparting compressive residual stress, the conditioning equipment having one or more first media accelerators being configured to impart the media of the defined type and the defined size at a first intensity at the sucker rods in the chamber; and
   shot peening equipment in operational communication with the controller and receiving the media from the media delivery equipment of the same defined type and the same defined size as received by the conditioning equipment, the shot peening equipment being configured to shot peen the conditioned surfaces of the sucker rods in a shot peening process in the chamber following the conditioning process, the shot peening process being configured to shot peen the conditioned surfaces without being dampened by the impurities, the shot peening equipment having one or more second media accelerators being configured to impart the media of the same defined type and the same defined size as the conditioning process at a second intensity at the sucker rods in the chamber, the second intensity of the shot peening process being greater than the first intensity of the conditioning process and being configured to shot peen the conditioned surfaces with the penetrations imparting the compressive residual stress.

2. The machine of claim 1, wherein the one or more first media accelerators comprise one or more first wheels; and wherein the one or more second media accelerators comprise one or more second wheels.

3. The machine of claim 2, wherein the one or more first wheels have a first diameter; and wherein the one or more second wheels have a second diameter, the second diameter being greater than the first diameter.

4. The machine of claim 2, wherein the one or more first wheels are rotated at a first rotational speed; and wherein the one or more second wheels are rotated at a second rotational speed, the second rotational speed being greater than the first rotational speed.

5. The machine of claim 2, wherein the one or more first wheels impart a first amount of the media within a given time period; and wherein the one or more second wheels impart a second amount of the media within the given time period, the second amount being greater than the first amount.

6. The machine of claim 1, wherein at least one of:
   the one or more second media accelerators are configured to impart the media at a second speed, the second speed being greater than a first speed imparted by the one or more first media accelerators;
   the one or more second media accelerators are configured to impart a second amount of the media within a given time period, the second amount being greater than a first amount imparted by the one or more first media accelerators within the given time period;
   the one or more second media accelerators are configured to impart the media for a second time period, the second time period being greater than a first time period for the one or more first media accelerators; and
   a second number of the one or more second media accelerators being greater than a first number of the one or more first media accelerators in the machine.

7. The machine of claim 1, wherein the handling equipment comprises a motorized mechanism in operational communication with the controller and being configured to move the sucker rods in the machine.

8. The machine of claim 7, wherein the motorized mechanism comprises a plurality of rollers, a pair of grippers, or a conveyor in the machine.

9. The machine of claim 1, wherein the handling equipment is configured to move the sucker rods at a same length per unit time in both the conditioning process and the shot peening process.

10. The machine of claim 1, further comprising media recovery equipment being configured to reclaim the media from the conditioning process and the shot peening process in the machine, the media recovery equipment being configured to deliver at least some of the reclaimed media to the media delivery equipment for delivery to both the conditioning process and the shot peening process.

11. The machine of claim 1, wherein the controller is configured to coordinate the conditioning process and the shot peening process relative to one or more characteristics of the sucker rods.

12. The machine of claim 11, wherein to coordinate the conditioning process and the shot peening process, the controller is programmable based on one or more of:
   a first parameter selected for the defined type of the media,
   a second parameter selected for the defined size of the media,
   a third parameter selected for the first intensity used in the conditioning process, and
   a fourth parameter selected for the second intensity used in the shot peening process.

13. The machine of claim 11, wherein to coordinate the conditioning process and the shot peening process, the controller is programmable based on a length per unit time selected to move the sucker rods in the machine for both the conditioning process and the shot peening process.

14. The machine of claim 1, wherein the controller is configured to coordinate one or more first controllable variables of the conditioning process and one or more second controllable variables of the shot peening process relative to one another for a combination of a plurality of diameters of the sucker rods and a plurality of hardness grades of the sucker rods.

15. The machine of claim 1, wherein the controller is configured to one of:
   perform the conditioning process and the shot peening process at a same time while the handling equipment moves the sucker rods from one end of the machine to another end of the machine; and perform the conditioning process for an initial time period followed by the shot peening process at a subsequent time period while the handling equipment handles the sucker rods in the chamber.

16. The machine of claim 1, wherein to handle the sucker rods in the chamber, the handling equipment is configured to at least one of:
move the sucker rods in one direction through the machine;
move the sucker rods back and forth in the machine; and
rotate the sucker rods in the machine.

17. The machine of claim 1, wherein at least one of:
the one or more first media accelerators are directed in a plurality of first directions toward the sucker rods; and
the one or more second media accelerators are directed in a plurality of second directions toward the sucker rods.

18. A method to treat sucker rods, the method comprising:
handling the sucker rods in a machine;
delivering media of a defined type and a defined size to both a conditioning process and a shot peening process;
conditioning unconditioned surfaces of the sucker rods in the conditioning process by receiving the media of the defined type and the defined size, imparting the media of the defined type and the defined size at a first intensity at the sucker rods using one or more first media accelerators operated in the machine, and removing impurities from the unconditioned surfaces to produce conditioned surfaces without penetrations imparting compressive residual stress; and
shot peening the conditioned surfaces of the sucker rods in the shot peening process following the conditioning process by receiving the media of the same defined type and the same defined size as received by the conditioning process, imparting the media of the defined type and the defined size at a second intensity at the sucker rods using one or more second media accelerators in the machine, the second intensity being greater than the first intensity, and producing the penetrations imparting the compressive residual stress in the conditioned surfaces without being dampened by the impurities.

19. The method of claim 18, comprising, before the conditioning process and the shot peening process, performing at least one of:
cleaning the sucker rods;
performing a visual inspection of the sucker rods;
performing an inspection of one or more dimensions of the sucker rods; and
performing a metallurgical inspection of the sucker rods.

20. The method of claim 18, wherein imparting the media at the first intensity comprises rotating one or more first wheels of the one or more first media accelerators; and wherein imparting the media at the second intensity comprises rotating one or more second wheels of the one or more second media accelerators.

21. The method of claim 20, wherein at least one of:
imparting the media at the first intensity comprises rotating the one or more first wheels having a first diameter, and imparting the media at the second intensity comprises rotating the one or more second wheels having a second diameter, the second diameter being greater than the first diameter;
imparting the media at the first intensity comprises rotating the one or more first wheels at a first rotational speed, and imparting the media at the second intensity comprises rotating the one or more second wheels at a second rotational speed, the second rotational speed being greater than the first rotational speed; and
imparting the media at the first intensity comprises rotating the one or more first wheels to impart a first amount of the media at the unconditioned surfaces of the sucker rods within a given time period; and wherein imparting the media at the second intensity comprises rotating he one or more second wheels to impart a second amount of the media against the conditioned surfaces of the sucker rods within the given time period, the second amount being greater than the first amount.

22. The method of claim 18, wherein at least one of:
imparting the media at the first intensity comprises imparting the media at a first speed against the unconditioned surfaces of the sucker rods, and imparting the media at the second intensity comprises imparting the media at a second speed against the conditioned surfaces of the sucker rods, the second speed being greater than the first speed;
imparting the media at the first intensity comprises imparting a first amount of the media against the unconditioned surfaces of the sucker rods within a given time period, and imparting the media at the second intensity comprises imparting a second amount of the media against the conditioned surfaces of the sucker rods within the given time period, the second amount being greater than the first amount;
imparting the media at the first intensity comprises imparting the media against the unconditioned surfaces of the sucker rods for a first time period, and imparting the media at the second intensity comprises imparting the media against the conditioned surfaces of the sucker rods for a second time period, the second time period being greater than the first time period; and
imparting the media at the first intensity comprises using a first number of the one or more first media accelerators in the machine, and imparting the media at the second intensity comprises using a second number of the one or more second media accelerators in the machine, the second number being greater than the first number.

23. The method of claim 18, wherein handling the sucker rods in the machine comprises at least one of:
moving the sucker rods in one direction through the machine;
moving the sucker rods back and forth in the machine; and
rotating the sucker rods in the machine;
manually moving the sucker rods in the machine; and
robotically moving the sucker rods in the machine.

24. The method of claim 18, further comprising reclaiming the media from the conditioning process and the shot peening process in the machine; and wherein delivering the media of the defined type and the defined size comprises reusing at least some of the reclaimed media in the conditioning process and the shot peening process in the machine.

25. The method of claim 18, further comprising coordinating the conditioning process and the shot peening process relative to one or more characteristics of the sucker rods.

26. The method of claim 25, wherein coordinating the conditioning process and the shot peening process relative to the one or more characteristics of the sucker rods comprises selecting one or more of:
a first parameter of the defined type of the media;
a second parameter of the defined size of the media;
a third parameter for the first intensity for the conditioning process; and
a fourth parameter for the second intensity for the shot peening process.

27. The method of claim 25, wherein coordinating the conditioning process and the shot peening process relative to the one or more characteristics of the sucker rods further comprises selecting a length per unit time to move the sucker rods in the machine for both the conditioning process and the shot peening process.

28. The method of claim 18, further comprising coordinating one or more first controllable variables of the conditioning process and one or more second controllable variables of the shot peening process relative to one another for a combination of a plurality of diameters of the sucker rods and a plurality of hardness grades of the sucker rods.

29. The method of claim 18, wherein conditioning the unconditioned surfaces of the sucker rods in the conditioning process, and shot peening the conditioned surfaces of the sucker rods in the shot peening process following the conditioning process comprises one of:

performing the conditioning process and the shot peening process at a same time while moving the sucker rods from one end of the machine to another end of the machine; and performing the conditioning process for an initial time period followed by performing the shot peening process at a subsequent time period while handling the sucker rods in the machine.

30. The method of claim 18, wherein at least one of:

conditioning the unconditioned surfaces of the sucker rods in the conditioning process comprises directing the one or more first media accelerators in a plurality of first directions toward the sucker rods; and shot peening the conditioned surfaces in the shot peening process comprises directing the one or more second media accelerators in a plurality of second directions toward the sucker rods.

* * * * *